(12) United States Patent
Perlman et al.

(10) Patent No.: US 9,559,953 B2
(45) Date of Patent: Jan. 31, 2017

(54) PATH SPLITTING WITH A CONNECTION-ORIENTED NETWORK

(75) Inventors: Radia Perlman, Redmond, WA (US); Ramakrishna Huggahalli, Costa Mesa, CA (US)

(73) Assignee: Intel Corporation, Santa Clara, CA (US)

( * ) Notice: Subject to any disclaimer, the term of this patent is extended or adjusted under 35 U.S.C. 154(b) by 302 days.

(21) Appl. No.: 13/994,175

(22) PCT Filed: Nov. 14, 2011

(86) PCT No.: PCT/US2011/060648
§ 371 (c)(1),
(2), (4) Date: Mar. 18, 2014

(87) PCT Pub. No.: WO2013/074075
PCT Pub. Date: May 23, 2013

(65) Prior Publication Data
US 2014/0185618 A1    Jul. 3, 2014

(51) Int. Cl.
*H04L 12/741* (2013.01)
*H04L 12/751* (2013.01)
*H04L 12/723* (2013.01)

(52) U.S. Cl.
CPC ............ *H04L 45/745* (2013.01); *H04L 45/10* (2013.01); *H04L 45/50* (2013.01)

(58) Field of Classification Search
CPC ........ H04L 45/745; H04L 45/10; H04L 45/50; H04L 29/0653; H04L 29/06095; H04L 49/309; H04L 49/3081; H04L 49/25; H04L 49/252; H04L 49/255; H04L 49/256
See application file for complete search history.

(56) References Cited

U.S. PATENT DOCUMENTS

| | | | | |
|---|---|---|---|---|
| 5,434,855 A | * | 7/1995 | Perlman | H04L 49/104 370/394 |
| 6,771,662 B1 | * | 8/2004 | Miki | H04L 49/3009 370/395.52 |

(Continued)

FOREIGN PATENT DOCUMENTS

| | | |
|---|---|---|
| CN | 1466339 A | 1/2004 |
| CN | 1756182 A | 4/2006 |

(Continued)

OTHER PUBLICATIONS

Office Action received for Chinese Patent Application No. 201180074840.7, mailed on Dec. 8, 2015, 15 pages of English translation and 14 pages of Chinese Office Action.

(Continued)

*Primary Examiner* — Thai Nguyen
*Assistant Examiner* — Phong La
(74) *Attorney, Agent, or Firm* — Grossman, Tucker, Perreault & Pfleger, PLLC

(57) ABSTRACT

In one embodiment this disclosure provides a network device that includes an input port configured to link to a first device to receive a packet from the first device, wherein the received packet having a first label encoded therein, the value of the first label is specific to the link between the network device and the first device; the input port having an input port identifier, the input port identifier and the first label form an input tuple; a plurality of output ports configured to link to respective ones of a plurality of second devices, each output port having a respective output port identifier; a forwarding table that includes at least one input tuple and a corresponding set of output tuples; wherein each output tuple comprises an output port identifier and a second label, the value of the second label is specific to the link between the network device and a respective one of the second plurality of devices; and routing circuitry configured (Continued)

to compare the input tuple of the received packet with at least one input tuple of the forwarding table, identify the corresponding set of output tuples, and select one output tuple from among the set of corresponding output tuples; the routing circuitry is also configured to replace the first label of the received packet with the second label and send the packet to the output port specified by the output port identifier in the selected output tuple.

25 Claims, 4 Drawing Sheets

(56) References Cited

U.S. PATENT DOCUMENTS

| | | | | |
|---|---|---|---|---|
| 7,088,718 | B1* | 8/2006 | Srivastava | H04L 45/00 370/392 |
| 7,616,637 | B1* | 11/2009 | Lee | H04L 12/4604 370/394 |
| 2003/0031192 | A1* | 2/2003 | Furuno | H04L 12/4633 370/409 |
| 2003/0214945 | A1* | 11/2003 | Kawamura | H04L 45/02 370/389 |
| 2005/0068953 | A1* | 3/2005 | Benjamin | H04L 45/50 370/389 |
| 2005/0089034 | A1* | 4/2005 | Sakata | H04L 12/4641 370/389 |
| 2009/0016331 | A1* | 1/2009 | Shah | H04L 45/128 370/356 |
| 2009/0109845 | A1* | 4/2009 | Andreasen | H04L 41/0893 370/230 |
| 2011/0096668 | A1* | 4/2011 | Bloch | H04L 45/38 370/237 |
| 2012/0195208 | A1* | 8/2012 | Abel | H04L 69/22 370/252 |

FOREIGN PATENT DOCUMENTS

| | | |
|---|---|---|
| CN | 1773952 A | 5/2006 |
| CN | 1805411 A | 7/2006 |
| CN | 101106522 A | 1/2008 |
| CN | 101175025 A | 5/2008 |

OTHER PUBLICATIONS

International Search Report and Written Opinion revived for PCT Application No. PCT/US2011/060648, mailed on Jul. 31, 2012, 9 Pages.
Bahk et al, "Dynamic Multi-path Routing and How it Compares with other Dynamic Routing Algorithms for High Speed Wide Area Networks", Association for Computing Machinery, 1992.
De et al, "Dynamic Multipath Routing in Networks and Switches Carrying Connection-Oriented Traffic", Center for Research in Wireless Mobility and Networking.
Office Action received for Chinese Patent Application No. 201180074840.7, mailed on May 9, 2016, 17 pages of English Translation and 14 pages of Chinese Office Action.

* cited by examiner

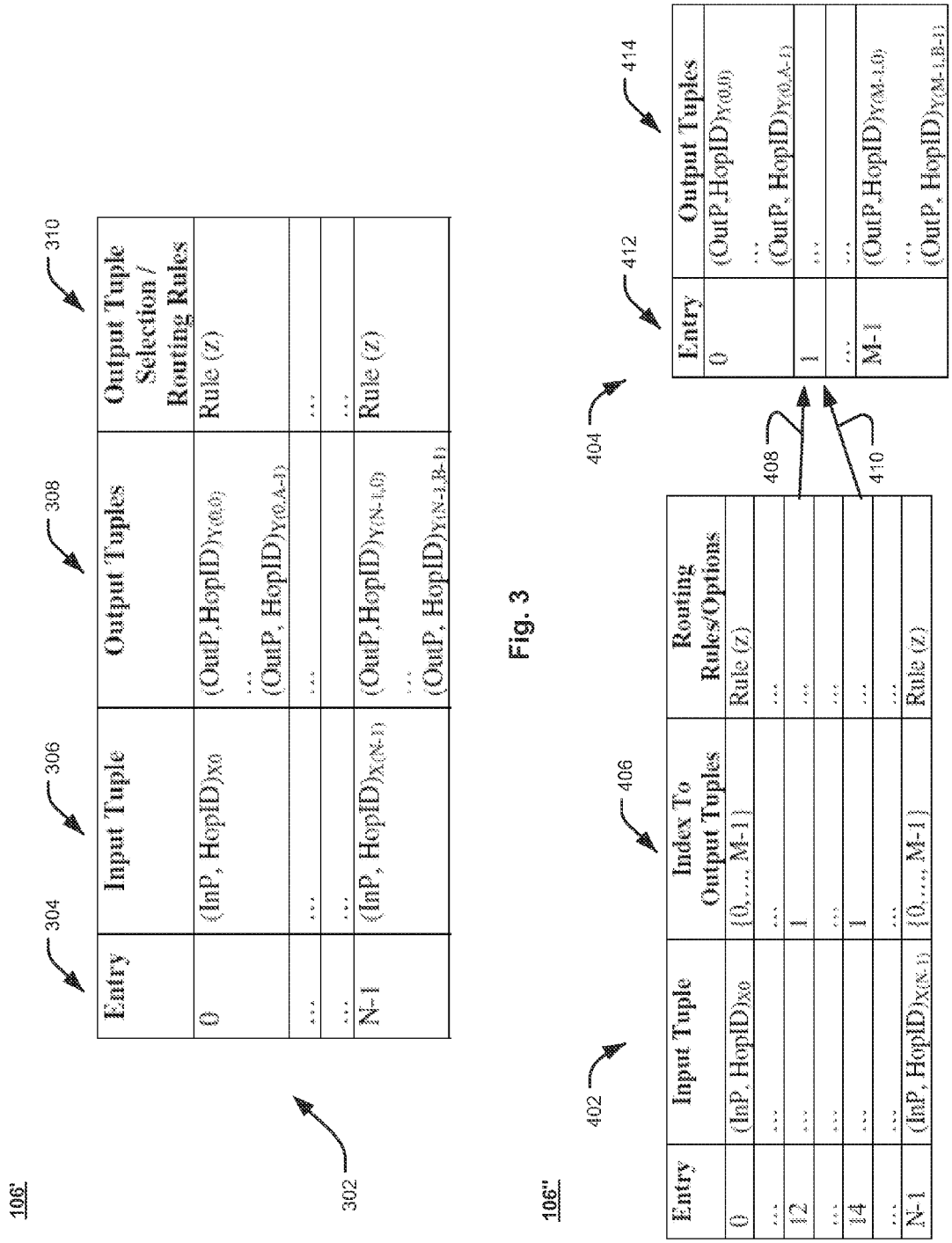

PATH SPLITTING WITH A CONNECTION-ORIENTED NETWORK

FIELD

This disclosure relates to path diversity techniques in a connection-oriented network.

BACKGROUND

A "connection-oriented" network, or path-based network, is defined by a network communication protocol that defines a path between a source node and a destination node. Examples of connection-oriented network communication protocols include X.25, Frame Relay, ATM, MPLS, etc. Typically, a packet header contains a field (called 'HopID' in this disclosure), which, together with the input port number, defines the path. A switch, along the path, contains a forwarding table that maps an input port, HopID tuple (P1, H1) to an output port, HopID tuple (P2, H2). When a packet with HopID H1 arrives on the input port P1, the switch looks up the (P1, H1) tuple in the forwarding table and finds that it is mapped to the (P2, H2) tuple. The switch replaces H1 with H2 in the HopID field of the packet and then forwards the packet to the output port P2. In conventional connection-oriented networks, in order to achieve any path diversity between the source and destination, multiple paths must be set up, in advance, between the source and destination. However, each path requires state (memory space and attendant system overhead) at the source, the destination and each intervening node, as well as designation of multiple HopIDs. In contrast, in a "connectionless" network, or destination-based network, the table consists of (destination address, output port) entries. Examples of connectionless network communication protocols include IP, Ethernet, etc. In certain topologies there are several potential next hops to a destination. In that case, the table includes (destination address, {output port}) entries, where the { } designates a plurality of output ports per destination address. If each switch contains k possible output ports, and there are h hops to the destination node, it is possible, in a connectionless network, to achieve h^k paths between the source and destination while only multiplying the state of the intervening switches by k. In the conventional connection-oriented network, however, such path diversity would require establishing h^k paths between the source and destination, thus significantly increasing the state and bandwidth requirements for each switch.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

FIG. 3 depicts an example of a forwarding table according to one embodiment of the present disclosure;

FIG. 4 depicts an example of a forwarding table according to another embodiment of the present disclosure.

Although the following Detailed Description will proceed with reference being made to illustrative embodiments, many alternatives, modifications, and variations thereof will be apparent to those skilled in the art.

DETAILED DESCRIPTION

Generally, this disclosure describes techniques for path diversity in a connection-oriented network. Path diversity, or path splitting, is provided at a switch level using a forwarding table that includes multiple output port/HopID pairs for at least one input port/HopID pair. Thus, as packets arrive at a switch, the forwarding table may dynamically provide multiple path choices for routing to the next "hop" in the path. In some embodiments, the forwarding table may be optimized to improve lookup efficiency and to reduce memory requirements. In addition, routing options and/or rules may be provided on a global or port-by-port basis to enable, for example, output port selection based on load balancing, packet flow requirements, application-specific routing requirements and/or a given switch network environment.

Figure 1:
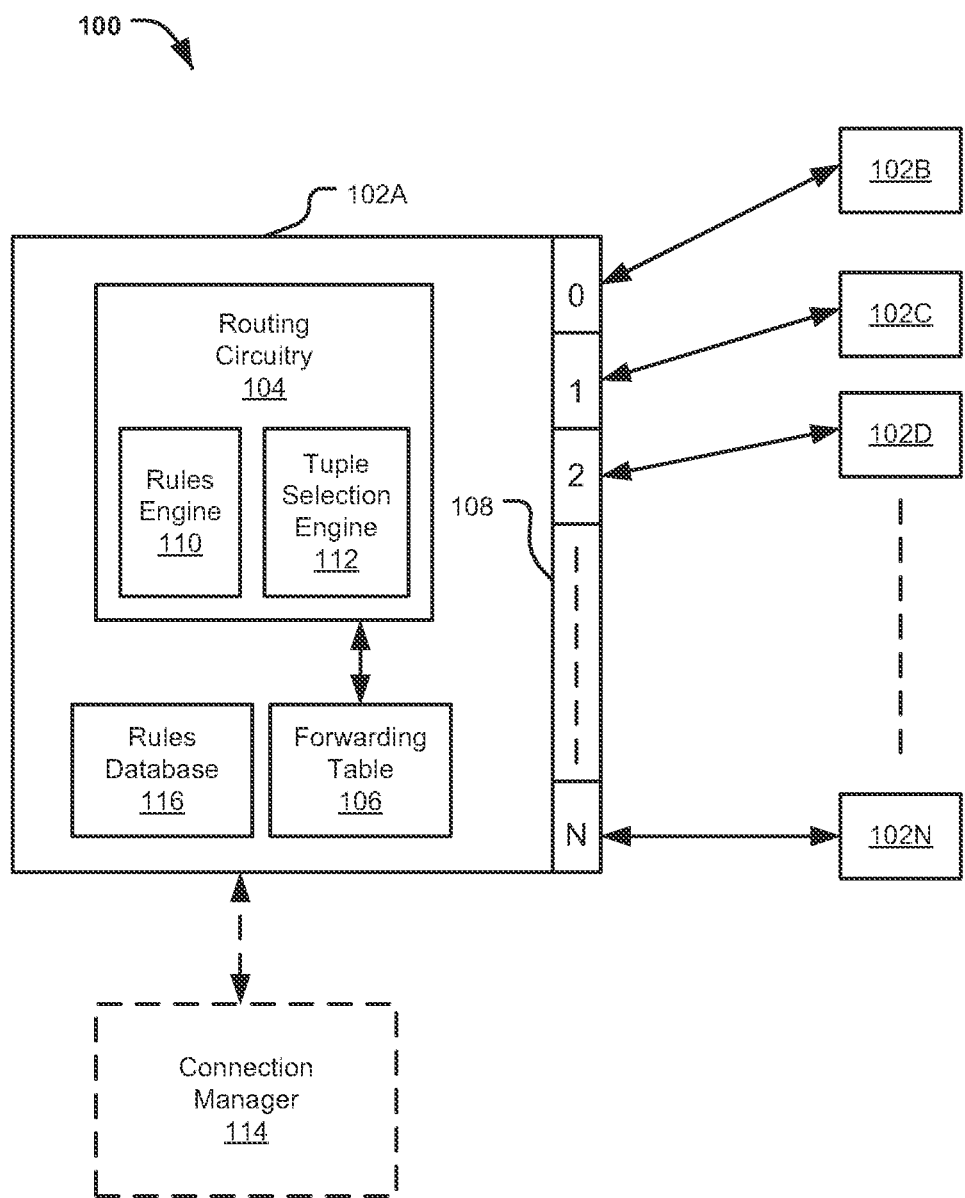
FIG. 1 illustrates a network system consistent with various embodiments of the present disclosure.

FIG. 1 illustrates a network system 100 consistent with various embodiments of the present disclosure. The system 100 generally includes a network device 102A configured to communicate with one or more external devices 102B, 102C, 102D . . . 102N. The device 102A is configured to communicate, at least in part, using a connection-oriented communications protocol (e.g., X.25, ATM, MPLS, Frame Relay, etc.), and the network system 100 may be generally defined as a connection-oriented network system. A "device" or "devices", as used in any embodiment herein, may comprise, singly or in combination, for example, a switch, a router and/or an endpoint node element that is configured to receive one or more data packets (or frames) from one or more devices and/or transmit one or more data packets (or frames) to one or more devices. It should be noted at the outset that although the following detailed description shall proceed with reference to network device 102A, it may be assumed that if devices 102B, 102C, 102D, . . . , 102N each comprise devices in communication with device 102A in a given network topology, then at least one of these devices 102B, 102C, 102D . . . 102N may be configured and operate in a similar manner as device 102A. In some embodiments, the network system 100 may include a connection manager 114 that is configured to communicate with and control at least one device (e.g., device 102A) to manage the network environment that is represented by the collection of devices.

Network device 102A may comprise an enclosure that includes a routing circuitry 104, a forwarding table 106 and one or more input/output ports 108, ports 108-0, 108-1, 108-2, . . . , 108-N. Each of the ports 108 are generally bi-directional, and a port receiving packets or frames shall be referred to herein as an "input port" or "InP" and a port from which packets or frames are sent shall be referred to herein as an "output port" or "OutP." Thus, Inp and OutP generally operate as identifiers for an input port number and output port number, respectively. As will be described in greater detail below, routing circuitry 104 is generally configured to receive packets (or frames) on one or more input ports 108 from one or more devices 102B, 102C, 102D, . . . , 102N and determine one or more output ports 108 from which to send the packets (or frames to one or more devices 102B, 102C, 102D, . . . , 102N, based on the forwarding table 106.

Figure 2:
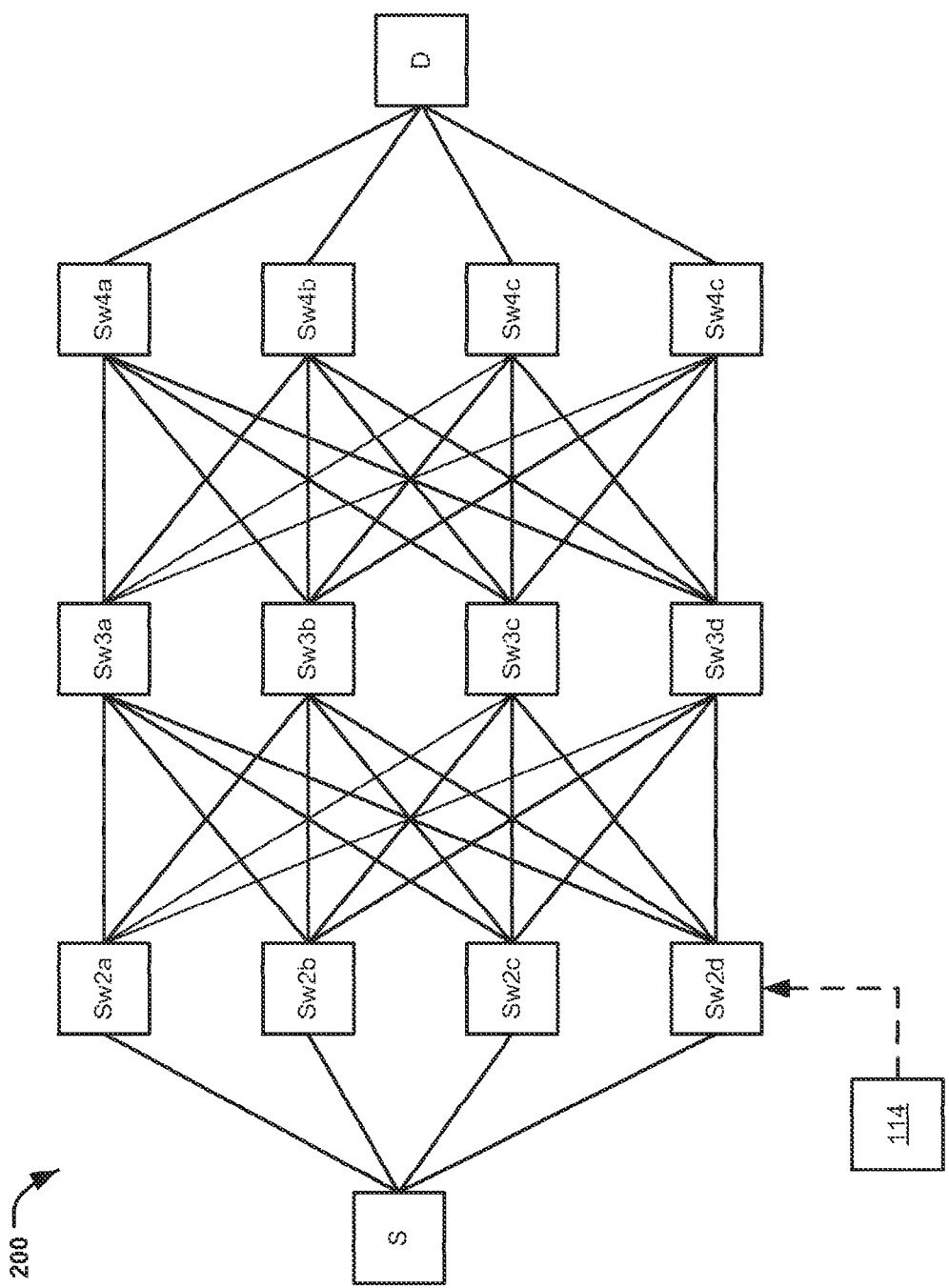
FIG. 2 is a diagram illustrating an exemplary network topology consistent with the present disclosure.

Before describing in detail the particulars of device 102A, a brief overview of an example network topology, in which device 102A may be deployed, is provided below. FIG. 2 is a diagram illustrating an exemplary network topology 200 consistent with the present disclosure. In this example, a source node (S) and a destination node (D) communicate with each other through a plurality of intervening nodes, i.e., switches Sw2a, . . . Sw2d, Sw3A, . . . , Sw3d, and Sw4a, . . . , Sw4d, where network device 102A may be any one of switches Sw2a, . . . Sw2d; Sw3A, . . . , Sw3d; or Sw4a, . . . , Sw4d. Each line between devices in FIG. 2 is segment of a path, each node may be referred to herein as a "hop," and each of the switches operate as intermediate nodes between the source (S) and destination (D) node. The source (S) and destination (D) nodes may be configured to encapsulate data into frames and each frame may be broken up into packets before being transmitted through the switches on the network. Taking switch Sw3a as an example, it is configured to receive packet flows from the source node (S) via any one of switches Sw2a, . . . , Sw2d, and switch Sw3a is configured to forward a packet flow to any one of switches Sw4a, . . . , Sw4d. Thus, SW3A has four input paths and four output paths, and there are four "hops" between the source node and the destination node.

Referring again to FIG. 1, to enable path diversity for the network device 102A, the forwarding table 106 maps at least one [InP, HopID] pair to a set of [OutP, HopID] pairs. An [OutP, HopID] pair is also referred to herein as an "output tuple," and an [InP, HopID] pair is also referred to herein as an "input tuple." In addition, the HopID associated with an input tuple is referred to herein as an "input HopID," and the HopID associated with an output tuple is referred to herein as an "output HopID." A HopID, or label, is a value used by the network device 102A to determine an output port. The HopID is used in conjunction with the input port so that the same HopID value on different input ports may, if needed, be mapped to different output ports and/or to different properties in the forwarding table. An input HopID may have a value that is specific to the link between the network device 102A and a device that sends packets to 102A, and an output HopID may have a value that is specific to the link between the network device 102A and a device receiving packets from device 102A. Thus, the input HopID is an output HopID from a preceding hop in the network, while an output HopID is an input HopID to a subsequent hop in the network. When combined with an input port number (InP) in the form of an input tuple (e.g., (InP, HopID)), the input tuple operates as an index into the forwarding table (e.g., table 106) to enable identification of at least one corresponding output tuple that is mapped to the input tuple.

For example, when a packet is received on a given port 108, the packet also includes a HopID (in this case, an input HopID since this HopID is associated with a received packet). Routing circuitry 104 is configured to parse an incoming packet to determine the HopID for that packet. Routing circuitry 104 is also configured to determine the port identification number where the packet arrived, and compare (e.g., look up operation) the input tuple of the received packet to the forwarding table 106 to determine the output tuples that are associated with the given input tuple. Once a set of output tuples is identified in the forwarding table 106, at least one output tuple is selected, the output HopID is used to replace the input HopID, and the packet is sent to the next device via the output port 108 specified in the selected output tuple.

The form of the HopID, or label, may be based on the particular communications protocol utilized for a given packet flow. For example, in the MPLS protocol, the HopID may be called a "label" and may conform to the "label" format specified under at least one version of the MPLS protocol, while in the ATM protocol, the HopID may be called a "virtual path identifier." Thus, the nomenclature "HopID," as used throughout this disclosure is intended to broadly cover any identifier or label whose value is based on a link between devices, regardless of the connection-oriented communications protocol which may be employed. In addition, while HopID is used as an example throughout this disclosure, such term is synonymous with "label," "identifier," "virtual path identifier," etc., and/or other term or terms that may be known to those skilled in the art, and/or after-developed terms, such that are used to describe an identifier or label whose value is based on a link between devices.

Routing circuitry 104 may also include a rules engine 110 and a tuple selection engine 112. The rules engine 110 is configured to apply routing rules regarding output tuple choice selection, and thus output port choice selection, for a given packet flow. Any of the rules may be applied on a global basis or an individual packet flow basis. Examples of rules that may be applied by the rules engine 110 include: all packets within a given frame use the same path, packets across two different frames are not interleaved on the same output port, application-specific path requirements (as may be established by the source node and/or connection manager 114), all frames within the same flow use the same path, load balancing rules applied to the output ports 108, etc. To that end, device 102A may also include a rules database 116 that is configured to store one or more rules regarding output port choice selection for a given packet flow, and rules engine 110 may be configured to query the rules database 116 to apply to any given packet (or frame). Of course, these are only examples of the types of rules that may be utilized by the rules engine 110, and those skilled in the art will recognize that numerous other packet flow rules may utilized according to the teachings presented herein. In addition, the rules may be applied on a port-by-port basis, or may be applied globally across the switch 102A, depending on, for example, packet flow and/or application path selection requirements.

Certain rules that may be used by device 102A may operate to restrict the output tuple selection, and thus, restrict the number of unique paths that are available for a given packet flow. Thus, once the routing circuitry 106 determines a set of output tuples that are associated with a given input tuple, the tuple selection engine 112 is configured to select an output tuple, subject to any rules (as determined by the rules engine 110) that may apply to a given packet (or frame). Once an output tuple is selected, the routing circuitry 104 is configured to replace the input tuple of the packet with the selected output tuple and send the packet to the next destination using the output port defined in the selected output tuple.

A connection manager 114 may be included, in some embodiments, to provide control over a given network topology. For example, the connection manager 114 may be configured to generate, for at least one device in the network system, the forwarding table 106 by mapping, for at least one input tuple, a plurality of output tuples that may be used for packet flows received on a given input port. In addition, the connection manager 114 may be configured to assign routing/output tuple selection rules for at least one device in the network system. To that end, the connection manager 114 may be configured to gather information related to the network system such as, source node packet flow capabilities and/or requirements, destination node packet flow capabilities and/or requirements, and/or the capabilities and/or requirements of one or more switches between the source and destination nodes (which may include, for example, the number of input ports/output ports, connections between switches, etc.). In addition, the connection manager 114 may be configured to generate the forwarding table 106 by determining InP and OutP, and designating input HopID and output HopID values based on the available HopID space as well as the specifics of the links between devices. In addition, the connection manager 114 may be configured to determine rules that may apply to output port selection, and correlating this information into the forwarding table 106. Of course, in some embodiments, the source and/or destination node, or any one of the switches in between the source/destination, may be configured to operate as the connection manager for a given switch topology, thus negating the need for a dedicated connection manager 114.

By default, the connection manager 114 (or other node operating as a connection manager) may establish a rule that all frames (packets) in the same flow use the same path. Here, a "flow" is defined as a collection of packets or frames that are related, and a frame may be broken into a plurality of packets. Thus, once an output tuple is selected for the first packet in a given flow, that output tuple may be used for subsequent frames in the given packet flow, thereby ensuring the same path is used. However, in some embodiments, the destination node may be configured to handle out-of-order frames. In this case, the connection manager 114 (or other node) may establish a rule for device 102A that frames in the same flow may use different paths through the network. Such a rule may also specify that packets within the same frame use the same path, but different frames may use different paths. To enable management of packets within a given frame, the source node may be configured to define a frame identifier (FrameID) field in each packet, and packets within a given frame may be assigned the same FrameID.

While frames from different flows originating at the same source node can be delivered to the destination out-of-order (OOO), the frames may arrive on the same input port of device 102A. To support path diversity in such a case, the source node may be configured to define a flow identifier (FlowID) field in the frame, which may be inserted into the first packet of each frame that is transmitted by the source node. In order to take advantage of path diversity given the rules that may be established (as noted above), the routing circuitry 104 may also be configured to distinguish among frames of different flows by determining a FlowID for packets received on the same input port. Routing circuitry 104 may then select an output port for each of the different flows, based at least in part on the defined rules.

FIG. 3 depicts an example of a forwarding table 106' according to one embodiment of the present disclosure. In this example, the forwarding table 106' includes a plurality of rows 302 corresponding to the number of input tuples designated for device 102A. An "Entry" column 304 defines an index for each row of the table. In this example, the index spans from 0 to N-1, representing the total number of possible input tuples that may be received by device 102A. An "Input Tuple" column 306 defines an input tuple in each row for all of the possible input tuples for device 102A. To provide path diversity by providing multiple output port options for at least one input tuple, "Output Tuples" column 308 defines a set of output tuples in each row corresponding to an input tuple. Thus, since each output tuple defines a specific (and possibly unique) output port, the table 106' provides multiple output port choices for a given input port.

A "Routing Rules/Options" column 310 defines a rule in each row for each input tuple and output tuple set. An entry in the "Rules" column may provide a pointer to a rules database (e.g., database 116 of FIG. 1) that specifies a rule for a given output tuple or set of output tuples, designated as Rule(z) in column 310, where (z) represents one or more rules directed to output tuple selection. Of course, one or more entries in the Rules column 310 may be blank, indicating that no rules apply to the selection of an output tuple. X(0) to X(N−1) represent the input tuples, where N is the total number of input tuples in the table 106'. (InP, HopID)X(0) means an arbitrary input tuple in Row 0 of the table 106'. Y(0,0) means the $0^{th}$ output tuple for Row 0, and Y(0,A−1) means the A−1th output tuple for Row 0. Thus, the input tuple for row 0 has a number of choices of output tuples. Y(N−1,0) means the $0^{th}$ output tuple for Row N−1, Y(N−1, B−1) means the B−1th output tuple in Row N−1, and thus the input X(N−1) in Row N−1, has B number of choices of output tuples. Of course, in some embodiments, rules may not be defined and/or required for a given output tuple, and thus, the corresponding row in column 310 may contain a null set.

In operation, and again referring to FIG. 1 with continued reference to FIG. 3, when a packet is received by device 102A, the routing circuitry 104 parses the packet header to determine the input HopID of the packet, and determine which port (InP) the packet came in on. The packet InP and HopID form the packet input tuple. The packet input tuple is compared to the listed input tuples (column 306) in table 106'. When a match is found, the corresponding set of output tuples (column 308) is determined, where the corresponding set of output tuples is used for output port selection. If present, one or more corresponding rules (column 310) may be determined, and the rules may operate to constrict the number of output port choices otherwise available among the set of output tuples.

FIG. 4 depicts an example of a forwarding table 106" according to another embodiment of the present disclosure. In this example, the forwarding table 106" includes a first table 402 and a second table 404. This embodiment depicts an example where at least one input tuple has an output tuple set in common with at least one other input tuple. Accordingly, the first table 402 includes an "Index To Output Tuples" column 406 that designates a set of output tuples, where the set of output tuples (corresponding to an input tuple) is assigned an index number ranging from {0, . . . , M−1}. The index number {0, . . . , M−1} is assigned based on a unique set of output tuples. This concept is demonstrated in rows 408 and 410 (corresponding to an entry index of 12 and 14, respectively) in table 402. For the input tuple defined in row 408, a set of output tuples is assigned an index of 1. Similarly, for the input tuple defined in row 410, a set of output tuples is assigned an index of 1. Thus, for the input tuples defined in these two rows, they share in common the set of possible output tuples. To reduce or eliminate the need to store separate copies of the same set of output tuples, the second table 404 may be used. In table 404, an "Entry" column 412 is provided, and each row of column 412 that corresponds to an index number from column 406 of table 402 (e.g., the number of rows corresponds to the number of indexes {0, . . . , M−1}). An "Output Tuples" column 414 is provided, and each row of column 414 designates the unique set of output tuples corresponding to each index in column 412. In this example, M is the number of rows (entries) in the table.

In operation, and again referring to FIG. 1 with continued reference to FIG. 4, when a packet is received by device 102A, the routing circuitry 104 parses the packet header to determine the input HopID of the packet, and determine which port (InP) the packet came in on. The packet InP and HopID form the packet input tuple. The input tuple of the packet is compared to the defined input tuples in first table 402. When a match is found, the corresponding index to output tuples (column 406) is determined. Using the index of column 406 as a pointer to the entry column 412 of table 404, the routing circuitry determines the corresponding set of output tuples (column 414) for the given input tuple. In addition, similar to the previous embodiment, one or more corresponding rules may be determined, and the rules may operate to constrict the number of output port choices otherwise available among the set of output tuples defined in column 414.

In either of the above examples of FIGS. 3 and 4, the number of output tuples for a given input tuple may be based on, for example, the particular network topology, a priori and/or dynamic path decisions made by the connection manager 114 (e.g., based on congestion statistics, weighting (biasing) of output port selection, etc.). Thus while a particular network topology may have a given set of possible output ports selections, the table (106'/106") may have a subset or superset of such possible output ports to reflect network environment choices and/or optimization selections.

An advantage of the forwarding table 106' and/or 106" according to the teachings of the present disclosure is a significant decrease in memory size requirements over conventional path diversity approaches in connection-oriented networks. For example, assume that for switch 102A there are k potential output ports for a given destination, and that the path length (i.e., number of hops) from the source node to the destination node is h. The table 106'/106" permits the connection-oriented network to utilize all h^k possible paths between the source node and destination node, but only a factor of k extra memory space for the forwarding table 106'/106" may be necessary, instead of h^k extra memory space required for conventional path diversity approaches. As can be appreciated, this offers significant memory requirement reduction, as well as reduced search operations in the table 106'/106".

Figure 5:
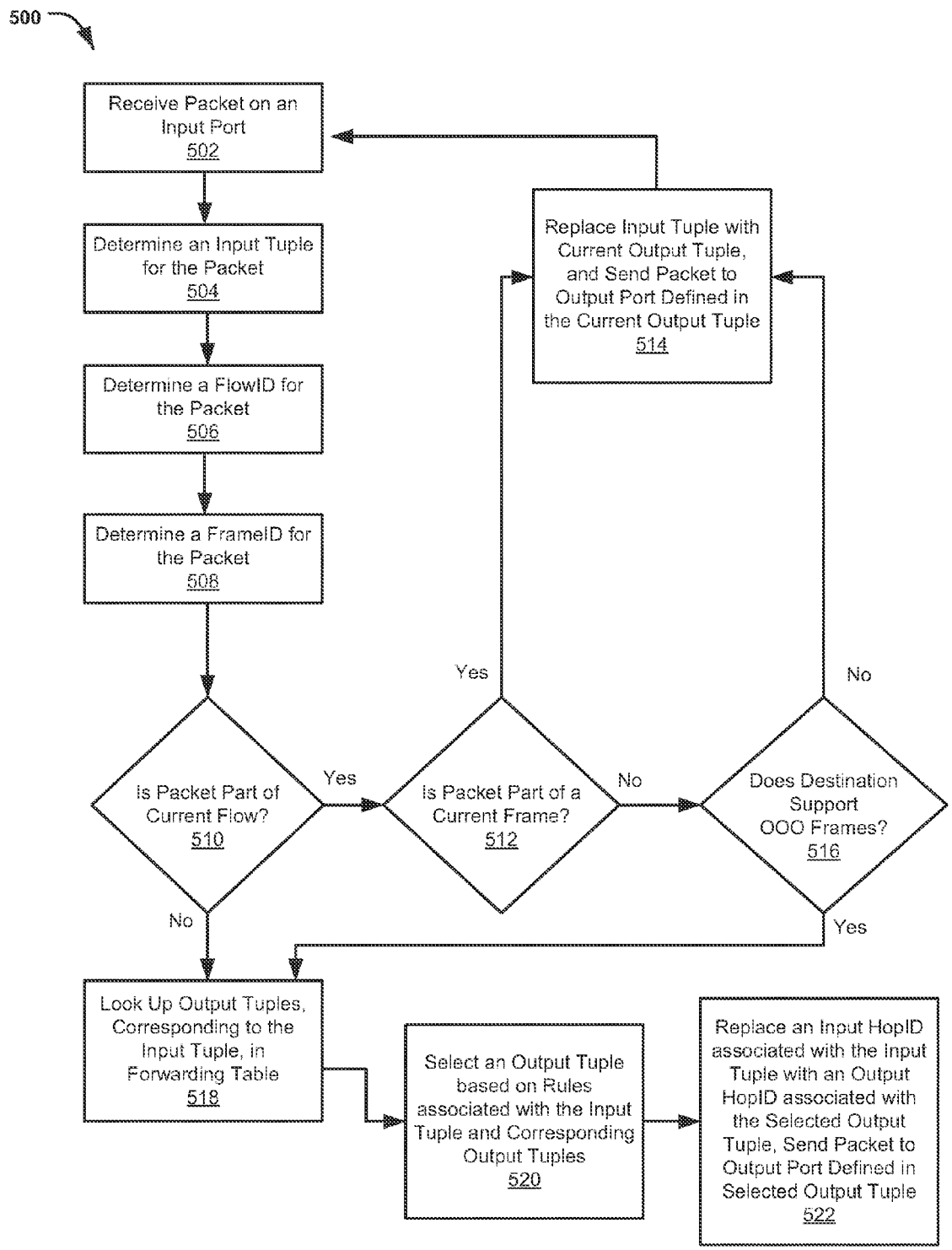
FIG. 5 illustrates a flowchart of exemplary operations consistent with one embodiment of the present disclosure.

FIG. 5 illustrates a flowchart 500 of exemplary operations consistent with one embodiment of the present disclosure. In particular, the flowchart of FIG. 5 depicts exemplary operations to enable path diversity in a network device (e.g., device 102A). Operations according to this embodiment may include receiving a packet on an input port 502. Operations of this embodiment may also include determining an input tuple for the received packet 504. The input tuple may include an input port identification number and input HopID (or similar label). In addition, operations of this embodiment may also include determining a flow identifier (FlowID) for the packet 506. The FlowID may be included as a predefined field in the packet header, and may be used to designate packets/frames that belong to the same flow. To reduce processing overhead and to avoid dropped packets at the destination node, it may be advantageous to route packets within the same frame along the same path. Accordingly, operations of this embodiment may also include determining a frame identifier (FrameID) for the packet 508. Operations may also include determining if the packet is part of a current packet flow 510. Here, "current" is used to designate an existing flow (as opposed to a new flow), as determined by the FlowID.

If the FlowID does not match an existing flow (510), this may be an indication that the packet is the first packet of a new frame in a new flow. Accordingly, operations of this embodiment may also include looking up a set of output tuples, corresponding to the input tuple of the packet, in a forwarding table 518. Once a set of output tuples is determined, operations may also include selecting an output tuple (among the output tuples in the set) based on one or more rules associated with the input tuple and/or the corresponding set of output tuples 520. Once an output tuple is selected, operations may also include replacing the input HopID (associated with the input tuple) of the packet with the output HopID from the selected output tuple, and sending the packet to the output port defined in the selected output tuple 522. Operations at 502 may begin again for the next packet.

If the FlowID matches an existing flow (510), this may be an indication that the packet is the first packet in a new frame of the current flow, or a second or subsequent packet in a current frame of the current flow. Accordingly, operations of this embodiment may also include determining if the packet is part of a current frame 512. Similarly, "current" is used to designate an existing frame (as opposed to a new frame), as determined by the FrameID. If the packet FrameID matches a current FrameID, meaning that the packet is a second or subsequent packet in a current frame, operations may also include replacing the packet input HopID with the HopID from the current output tuple (meaning the output topic that is being used for the current frame), and sending the packet to the output port defined in the current output tuple 514. Operation 514 may be advantageous to reduce memory read and forwarding table look up operations, and may include buffering of FlowID, FrameID and selected output tuple information so that such information is readily available for such packets. Operations at 502 may begin again for the next packet.

If the packet FrameID does not match a current FrameID (512), but the FlowID matches an existing (current) flow (510), this may be an indication that the packet is the first packet of a new frame in a current flow. Accordingly, operations of this embodiment may also include determining if a destination node supports out-of-order (OOO) frames 516. Support for OOO frames is an indication that frames within the same flow may arrive out of order at the destination, and thus, each frame within a given flow may use a different output port. If OOO frames are not supported (516), the operations described above at 514 may be used. If OOO frames are supported (516), the operations described above at 518, 520 and 522 may be used.

While FIG. 5 illustrates various operations according one embodiment, it is to be understood that not all of the operations depicted in FIG. 5 are necessary for other embodiments. Indeed, it is fully contemplated herein that in other embodiments of the present disclosure, the operations depicted in FIG. 5 and/or other operations described herein may be combined in a manner not specifically shown in any of the drawings, but still fully consistent with the present disclosure. Thus, claims directed to features and/or operations that are not exactly shown in one drawing are deemed within the scope and content of the present disclosure.

Any of the operations described herein may be implemented in a system that includes one or more storage mediums having stored thereon, individually or in combination, instructions that when executed by one or more processors perform the methods. Here, the processor may include, for example, a system CPU and/or other programmable circuitry. Also, it is intended that operations described herein may be distributed across a plurality of physical devices, such as processing structures at more than one different physical locations. The storage medium may include any type of tangible medium, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions. Other embodiments may be implemented as software modules executed by a programmable control device.

Device 102A may be capable of communicating with one or more devices 102B, 102C, 102D, . . . 102N using a selected packet switched network communications protocol. One exemplary communications protocol may include an Ethernet communications protocol which may be capable permitting communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in March, 2002 and/or later versions of this standard. Alternative or additionally, device 102A may be capable of communicating with one or more devices 102B, 102C, 102D . . . 102N using an X.25 communications protocol. The X.25 communications protocol may comply or be compatible with a standard promulgated by the International Telecommunication Union-Telecommunication Standardization Sector (ITU-T). Alternatively or additionally, device 102A may be capable of communicating with one or more devices 102B, 102C, 102D . . . 102N using a frame relay communications protocol. The frame relay communications protocol may comply or be compatible with a standard promulgated by Consultative Committee for International Telegraph and Telephone (CCITT) and/or the American National Standards Institute (ANSI). Alternatively or additionally, device 102A may be capable of communicating with one or more devices 102B, 102C, 102D . . . 102N using an Asynchronous Transfer Mode (ATM) communications protocol. The ATM communications protocol may comply or be compatible with an ATM standard published by the ATM Forum titled "ATM-MPLS Network Interworking 1.0" published August 2001, and/or later versions of this standard.). Alternatively or additionally, device 102A may be capable of communicating with one or more devices 102B, 102C, 102D . . . 102N using a Multiprotocol Label Switching Architecture (MPLS) communications protocol. The MPLS communications protocol may comply or be compatible with an MPLS standard published by The Internet Society titled "Multiprotocol Label Switching Architecture," RFC 3031, published January 2001, and/or later versions of this standard. Of course, switch 102A may be configured to communicate using other and/or after-developed connection-oriented network communication protocols.

"Circuitry", as used in any embodiment herein, may comprise, for example, singly or in any combination, hardwired circuitry, programmable circuitry, state machine circuitry, and/or firmware that stores instructions executed by programmable circuitry. An "engine", as used in any embodiment herein, may be embodied as circuitry. The circuitry may be embodied as an integrated circuit, such as an integrated circuit chip. It should be noted that the forwarding table 106 and/or the rules database 116 may be embodied as data structures stored in a storage medium, as defined above.

Thus, advantageously, the present disclosure provides path diversity in a connection-oriented network. In one embodiment, the present disclosure provides a network device that includes an input port configured to link to a first device to receive a packet from the first device, wherein the received packet having a first label encoded therein the value of the first label is used by the network device 102A to determine an output port; the input port having an input port identifier, the input port identifier and the first label form an input tuple. The network device also includes a plurality of output ports configured to link to respective ones of a plurality of second devices, each output port having a respective output port identifier. The network device also includes a forwarding table that includes at least one input tuple and a corresponding set of output tuples; wherein each output tuple comprises an output port identifier and a second label The network device further includes routing circuitry configured to communicate with at least the first device and the second devices, the routing circuitry is further configured to compare the input tuple of the received packet with at least one input tuple of the forwarding table, identify the corresponding set of output tuples, and select one output tuple from among the set of corresponding output tuples; the routing circuitry is also configured to replace the first label of the received packet with the second label and send the packet to the output port specified by the output port identifier in the selected output tuple.

In another embodiment, the present disclosure provides a method that includes receiving, on an input port of a network device, a packet from a first device linked to the network device; determining an input tuple associated with the packet, the input tuple defining an input port identifier and a first label; comparing the input tuple with a forwarding table, the forwarding table includes the input tuple and a corresponding set of output tuples, wherein each output tuple comprises an output port identifier and a second label; selecting one of the output tuples in the set of output tuples; replacing the first label of the received packet with the second label from the selected output tuple; and sending the packet, to an output port specified by the output port identifier in the selected output tuple.

In another embodiment, the present disclosure provides a system comprising, one or more storage mediums having stored thereon, individually or in combination, instructions that when executed by one or more processors result in the following operations that include:

determining an input tuple associated with a packet received on an input port of a network device from a first device lined to the network device, the input tuple defining an input port identifier and a first label, the value of the first label is based on the link between the network device and the first device;

comparing the input tuple with a forwarding table, the forwarding table includes the input tuple and a corresponding set of output tuples, wherein each output tuple comprises an output port identifier and a second label, the value of the second label is based on a link between the network device and a respective one of a second plurality of devices linked to a respective output port;

selecting one of the output tuples in the set of output tuples;

replacing the first label of the received packet with the second label from the selected output tuple; and sending the packet, using a connection-oriented communications protocol, to an output port specified by the output port identifier in the selected output tuple.

In yet another embodiment the present disclosure provides a forwarding table configured to be utilized to route one or more packets in a connection-oriented network, the forwarding table comprising at least one input tuple and a corresponding set of output tuples; wherein each input tuple defining an input port identifier and a first label, the value of the first label is based on the link between the network device and a first device; and wherein each output tuple defines an output port identifier and a second label, the value of the second label is based on a link between the network device and a respective one of a second plurality of devices linked to a respective output port.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A network device, comprising:
    an input port to link to a first device to receive a packet from the first device, wherein the received packet includes a first label having a value specific to the link between the network device and the first device; the input port having an input port identifier, the input port identifier and the first label form an input tuple;
    a plurality of output ports to link to respective ones of a plurality of second devices, each output port having a respective output port identifier;
    a forwarding table that includes:
        a first table that includes a plurality of input tuples, a respective output tuple index and a respective rule logically associated with each of the plurality of input tuples; and
        a second table that includes a respective plurality of output tuples associated with each respective output tuple index; wherein each output tuple included in each respective plurality of output tuples includes an output port identifier and a second label, having a value specific to the link between the network device and the respective ones of the plurality of second devices; and
    routing circuitry to:
        compare the input tuple of the received packet with the at least one input tuple of the forwarding table, identify the corresponding set of output tuples;
        cause a rules engine to and select one output tuple from among the respective plurality of output tuples per the rule logically associated with the respective input tuple;
        replace the first label of the received packet with the second label; and
        send the packet to the output port specified by the output port identifier in the selected output tuple.

2. The network device of claim 1, wherein the routing circuitry is further configured to communicate with the at least the first device and the plurality of second devices using a connection-oriented communications protocol selected from a communication protocol that complies with an X.25 protocol, an asynchronous transfer (ATM) protocol, a Multiprotocol Label Switching (MPLS) protocol, or a Frame Relay protocol.

3. The network device of claim 1, wherein the routing circuitry is further configured to determine if the packet is part of a current packet flow and if part of the current packet flow then constraining the selection of output tuples to retaining packet ordering within the flow.

4. The network device of claim 1, wherein the routing circuitry is further configured to determine if the packet is part of a current frame; and the routing circuitry is further configured to determine if an endpoint node, in communication with the network device, supports out-of-order frames.

5. The network device of claim 4, wherein if the packet is part of a current frame, the selected output tuple is an output tuple that is used for at least one other packet in the current frame.

6. The network device of claim 1, wherein the forwarding table includes a list of input tuples, a list of corresponding set of output tuples for at least one input tuple, and at least one rule associated with at least one set of output tuples.

7. The network device of claim 1, wherein the routing circuitry is further configured to determine at least one rule associated with the set of output tuples, the at least one rule specifying output port selection based on load balancing among the plurality of possible output ports defined in the set of output tuples.

8. A method, comprising:
    receiving, on an input port of a network device, a packet from a first device linked to the network device;
    determining an input tuple associated with the packet, the input tuple defining an input port identifier and a first label, the value of the first label is specific to the link between the network device and the first device;
    comparing the input tuple with a forwarding table that includes:
        a first table that includes a plurality of input tuples, a respective output tuple index and a respective rule logically associated with each of the plurality of input tuples; and
        a second table that includes a respective plurality of output tuples associated with each respective output tuple index; wherein each output tuple included in each respective plurality of output tuples includes an output port identifier and a second label having a value specific to the link between the network device and a respective one of a second plurality of devices linked to a respective output port;
    causing a rules engine to select, per the rule logically associated with the respective input tuple, one of the output tuples from among the respective plurality of output tuples;
    replacing the first label of the received packet with the second label from the selected output tuple; and
    sending the packet to an output port specified by the output port identifier in the selected output tuple.

9. The method of claim 8, wherein the routing circuitry is further configured to communicate with the at least the first device and the second plurality of devices using a connection-oriented communications protocol selected from a communication protocol that complies with an X.25 protocol, an asynchronous transfer (ATM) protocol, a Multiprotocol Label Switching (MPLS) protocol, or a Frame Relay protocol.

10. The method of claim 8, further comprising:
    determining if the packet is part of a current packet flow and if part of the current packet flow then constraining the selection of output tuples to retaining packet ordering within the flow.

11. The method of claim 8, further comprising:
determining if the packet is part of a current frame; and
determining if an endpoint node supports out-of-order frames, wherein the endpoint node is in communication with the network device.

12. The method of claim 11, wherein if the packet is part of a current frame, the selected output tuple is an output tuple that is used for at least one other packet in the current frame.

13. The method of claim 8, wherein the forwarding table includes a list of input tuples, a list of corresponding set of output tuples for at least one input tuple, and at least one rule associated with at least one set of output tuples.

14. The method of claim 8, further comprising:
determining at least one rule associated with the set of output tuples, the at least one rule specifying output port selection based on load balancing among the plurality of possible output ports defined in the set of output tuples.

15. A storage device having stored thereon, individually or in combination, instructions that when executed by one or more processors result in the following operations comprising:
determining an input tuple associated with a packet received on an input port of a network device from a first device linked to the network device, the input tuple defining an input port identifier and a first label, the value of the first label is specific to the link between the network device and the first device;
comparing the input tuple with a forwarding table that includes:
a first table that includes a plurality of input tuples, a respective output tuple index and a respective rule logically associated with each of the plurality of input tuples; and
a second table that includes a respective plurality of output tuples associated with each respective output tuple index; wherein each output tuple included in each respective plurality of output tuples includes an output port identifier and a second label having a value specific to a link between the network device and a respective one of a second plurality of devices linked to a respective output port;
causing a rules engine to select, per the rule logically associated with the respective input tuple, one of the output tuples from among the respective plurality of output tuples;
replacing the first label of the received packet with the second label from the selected one of the output tuples; and
sending the packet to an output port specified by the output port identifier in the selected output tuple.

16. The storage device of claim 15, wherein the instructions that when executed by one or more of the processors result in the following additional operations comprising:
communicating with the at least the first device and the second plurality of devices using a connection-oriented communications protocol selected from a communication protocol that complies with an X.25 protocol, an asynchronous transfer (ATM) protocol, a Multiprotocol Label Switching (MPLS) protocol, or a Frame Relay protocol.

17. The storage device of claim 15, wherein the instructions that when executed by one or more of the processors result in the following additional operations comprising:
determining if the packet is part of a current packet flow and if part of the current packet flow then constraining the selection of output tuples to retaining packet ordering within the flow.

18. The storage device of claim 15, wherein the instructions that when executed by one or more of the processors result in the following additional operations comprising:
determining if the packet is part of a current frame; and
determining if an endpoint node supports out-of-order frames, wherein the endpoint node is in communication with the network device.

19. The storage device of claim 18, wherein if the packet is part of a current frame, the selected output tuple is an output tuple that is used for at least one other packet in the current frame.

20. The storage device of claim 15, wherein the forwarding table includes a list of input tuples, a list of corresponding set of output tuples for at least one input tuple, and at least one rule associated with at least one set of output tuples.

21. The storage device of claim 15, wherein the forwarding table comprises:
a first table that includes a list of input tuples, a list of corresponding output tuple indexes, each output tuple index is assigned to a set of output tuples, and at least one rule pointer associated with at least one set of output tuples; and
a second table that includes a list of the corresponding output tuple, and a list of corresponding output tuples associated with each index; wherein multiple instances of an index in the first table are reduced to a single instance in the second table.

22. The storage device of claim 15, wherein the instructions that when executed by one or more of the processors result in the following additional operations comprising:
determining at least one rule associated with the set of output tuples, the at least one rule specifying output port selection based on load balancing among the plurality of possible output ports defined in the set of output tuples.

23. A network device, comprising:
a forwarding table that includes at least one input tuple and a corresponding set of output tuples; wherein each input tuple defining an input port identifier and a first label, the value of the first label is specific to the link between the network device and a first device; and wherein each output tuple defines an output port identifier and a second label, the value of the second label is specific to a link between the network device and a respective one of a second plurality of devices linked to a respective output port; and
routing circuitry to:
determine an input tuple of a received packet;
compare the input tuple with the forwarding table that includes:
a first table that includes a plurality of input tuples, a respective output tuple index and a respective rule logically associated with each of the plurality of input tuples; and
a second table that includes a respective plurality of output tuples associated with each respective output tuple index; wherein each output tuple included in each respective plurality of output tuples includes an output port identifier and a second label having a value specific to the link between the network device and a respective one of a second plurality of devices linked to a respective output port;

identify the corresponding set of output tuples;

cause a rules engine to select, per the rule logically associated with the respective input tuple, output tuple from among the respective plurality output tuples;

replace the first label of the received packet with the second label; and send the packet to the output port specified by the output port identifier in the selected output tuple.

24. The network device of claim 23, wherein the forwarding table further comprises:

a first table that includes a list of input tuples, a list of corresponding output tuple indexes, each output tuple index is assigned to a set of output tuples, and at least one rule pointer associated with at least one set of output tuples; and a second table that includes a list of the corresponding output tuple, and a list of corresponding output tuples associated with each index; wherein multiple instances of an index in the first table are reduced to a single instance in the second table.

25. The network device of claim 23, wherein the forwarding table further comprising at least one rule associated with the set of output tuples, the at least one rule specifying output port selection based on load balancing among the plurality of possible output ports defined in the set of output tuples.

* * * * *